Patented July 19, 1932

1,868,388

UNITED STATES PATENT OFFICE

ARTHUR HOUGH, OF PASSAIC, NEW JERSEY

EXPLOSIVE

No Drawing.    Application filed December 3, 1928.   Serial No. 323,583.

My invention relates to the manufacture of liquid nitrates.

The object of my invention is to produce commercially and economically, a liquid nitrate which may be employed alone or dissolved in tri-nitro glycerine in any desired proportions to produce the desired results, whether these apply to lowering the freezing point of the nitro-glycerine, or adding to its power, or to producing a mixture that will have a greater solvent property on nitro-cellulose. Or the new product may be employed in the manufacture of smokeless powder propellants, by causing to dissolve nitro-cellulose or its equivalent, such as amylose nitrate or any of the nitro-saccharoses, with or without the assistance of another solvent such as acetone or ether-alcohol.

I have discovered that di-ethylene glycol, having the formula,

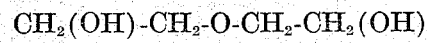

$CH_2(OH)-CH_2-O-CH_2-CH_2(OH)$ may be economically nitrated to the di-nitrate, $CH_2(NO_3)-CH_2-O-CH_2-CH_2(NO_3)$ if certain precautions are observed relative to the total acidity of the nitrating acid mixture, as well as the ratio of the nitric acid to the sulphuric acid, all of which has been fully explained and outlined in an application filed by me concurrently herewith under the title of Method of nitrating organic substances, several acid mixtures being cited of compositions that will give good results, for instance a mixed acid containing $HNO_3$ 46.41%; $H_2SO_4$ 47.27%; $H_2O$ 6.32%, will give excellent results. Or still better an acid mixture containing $HNO_3$ 51.06%; $H_2SO_4$ 41.6; $H_2O$ 7.34% will give practically a theoretical yield of the di-ethylene glycol di-nitrate, in any case when the ratio of nitric to sulphuric acids is varied within considerable limits, the water content must be maintained relatively high as compared with the acid mixtures employed for the nitration of glycerine or ethylene glycol.

With such acid mixtures as I have described, the nitration proceeds very smoothly, and the separation of the di-ethylene glycol di-nitrate from the spent acids, after few minutes is sharp and well defined, generally four minutes is sufficient time after the agitation is stopped, for a good separation.

The product may now be decanted from the spent acids, and given a preliminary wash with cold water, after which it should be washed with water containing a little alkali to neutralize any free acid present. A last wash with plain warm water will give a product of great chemical stability, and having the following characteristics by which the di-ethylene glycol di-nitrate may be identified.

Specific gravity at 15° C., 1.39; nitrogen content, 14.29%; colour (anhydrous), water white, freezing point, minus 11.2° C. to minus 11.4° C.; boiling point 160° C. to 161° C.

The chemical stability of di-ethylene glycol di-nitrate is extraordinary (exceeding by far that of tri-nitroglycerine) which recommends it for the preparation particularly of smokeless powder propellants.

Before my discovery relative to the condition of acid mixtures absolutely necessary to commercially and economically nitrate the di-ethylene glycol, and in the past year, attempts have been made by those engaged in the explosive industry to nitrate this substance, but they have usually employed acid mixtures totally unfitted for the purpose, and low yields, and actual decomposition of the nitrated product in process occurred, in addition to which complete and prompt, separation of the di-glycol di-nitrate from the spent acids could not be brought about, vide, Journal Industrial & Engineering Chemistry, vol. 19, August 1927, page 925, Rinkenbach. All attempts to prepare the pure di-glycol di-nitrate uncontaminated with products of side reactions failed, and a higher nitrogen content than 14.12% (the nitrogen content of the pure product being 14.29%) was never obtained.

Claim.

1. A new product of manufacture, di-ethylene glycol di-nitrate, having the composition $CH_2(NO_3).CH_2.O.CH_2.CH_2(NO_3)$, containing about 14.29% nitrogen, substantially free from other nitrated products of glycols.

2. The new compound diethylene glycol dinitrate, in a substantially pure state.

3. A new product of manufacture, diethylene glycol dinitrate, having the composition $CH_2(NO_3)$-$CH_2$-O-$CH_2$-$CH_2(NO_3)$, containing about 14.29% nitrogen, in a substantially pure state.

Signed at Passaic in the county of Passaic and State of N. J. this 1st day of December 1928.

ARTHUR HOUGH.